United States Patent [19]
VanVleck et al.

[11] 4,066,560
[45] Jan. 3, 1978

[54] SILICONE COMPOSITIONS USEFUL AS GREEN TIRE LUBRICANTS

[75] Inventors: Gordon T. VanVleck; Frank J. Traver, both of Troy, N.Y.

[73] Assignee: General Electric Company, Waterford, N.Y.

[21] Appl. No.: 724,447

[22] Filed: Sept. 20, 1976

[51] Int. Cl.$^2$ .................. C10M 3/18; C10M 5/14; C10M 7/20; C10M 7/24

[52] U.S. Cl. ........................................ 252/21; 252/28; 252/49.5

[58] Field of Search ........................ 252/21, 28, 49.5

[56] References Cited

U.S. PATENT DOCUMENTS

| | | | |
|---|---|---|---|
| 2,733,272 | 1/1956 | Horsley et al. | 252/52 R |
| 3,532,624 | 10/1970 | Cekada | 252/28 |
| 3,554,910 | 1/1971 | Johnson | 252/49.5 |
| 3,713,851 | 1/1973 | Cekada | 252/28 |
| 3,759,827 | 9/1973 | Groenhof et al. | 252/49.6 |
| 3,835,052 | 9/1974 | McDole et al. | 252/49.5 |
| 3,915,869 | 10/1975 | Katono et al. | 252/49.5 |
| 3,967,968 | 7/1976 | Stone et al. | 252/28 |

*Primary Examiner*—Delbert E. Gantz
*Assistant Examiner*—Irving Vaughn
*Attorney, Agent, or Firm*—E. Philip Koltos; John L. Young; Frank L. Neuhauser

[57] ABSTRACT

An improved process for producing a silicone composition useful as a green tire lubricant with improved lubricity properties comprising mixing initially the diorganopolysiloxane with a mica filler to form a homogeneous mixture and then subsequently adding to this mixture the other necessary ingredients such as a polyol, a mineral clay, an emulsifying agent and finally adding water and mixing the mixture to produce a dispersion.

There is a second improved process in accordance with the present invention in which the viscosity of the final green tire lubricant mixture irrespective of how it is prepared is decreased by the addition of buffering agents.

21 Claims, No Drawings

SILICONE COMPOSITIONS USEFUL AS GREEN TIRE LUBRICANTS

BACKGROUND OF THE INVENTION

The present invention relates to an improved process for producing a silicone composition useful as a green tire lubricant, and more particularly, the present invention relates to an improved process for preparing a green tire lubricant with improved lubricity properties wherein the improvement comprises mixing the polydiorganosiloxanes with the mica filler initially to form a homogeneous mixture before the other necessary and optional ingredients are added.

Lubricants for green tire bladders are well-known. See, for instance, the patent application of Frank J. Traver, Ser. No. 534,101, filed Dec. 19. 1974, entitled WATER BASED GREEN TIRE LUBRICANTS and the prior art cited in that application.

In the manufacture and vulcanization of tires, the green tire mass, which is in the form of a cylinder, is placed in the mold and as the mold closes, the bladder, or bag as it is known in the industry, is inflated by means of air pressure or hot water inside the tire. This inflation forms the tire into the shape of the mold. It has become necessary in this manufacturing procedure of tires, to apply a lubricant to the inside of that green tire mass, one such that the bladder will have the appropriate static friction to apply pressure for the formation of the tire and also so that the bladder will have some slipping properties so that it will not rupture.

Early in such manufacturing procedures organic lubricants were utilized but it was found that such organic lubricants lacked the proper lubricity properties, that is, such lubricants did not have the combination of static friction to sliding friction which was necessary for a particular green tire mass design. It was found that silicone lubricants were, in certain cases, more desirable in the lubrication of bladders for the formation of vulcanized tires from green tire masses. Accordingly, one example of such silicone green tire lubricants is found in the foregoing Traver patent application.

Silicone lubricating compositions, while having many advantages in terms of lubricity properties and high temperature stability, nevertheless, did not always present the optimum lubricity properties for the bladder in the vulcanization of the green tire mass to form vulcanized tires.

Accordingly, it was found for many green tire designs that the silicone lubricant composition that was most desirable was one where the static friction was a tenth of a point larger than the sliding friction as determined by lubricating methods and where the static friction was at least 0.4. Such a combination of static to sliding friction was often obtained by merely varying the amount of filler or the amount of silicone polymer that was utilized in the composition or the variation of other ingredients to get the appropriate combination of static to sliding friction. Unfortunately, however, the resulting lubricant even though having the desired static to sliding friction combination would in many cases, as a result of the excessive loadings of filler, precipatate such filler out of the lubricant composition into the inner part of the tire and as a result the lubricant would lose its effectiveness. Accordingly, in such cases unless the silicone lubricant was continually applied to the bladder after the vulcanization of each tire there would result a rupture of the bladder.

It should also be pointed out that in such silicone green tire lubricant compositions, it was highly desirable to have mica as a filler. Mica is desirable as a filler in such green tire lubricant compositions since it imparts to the lubricant the proper balance of allowing the lubricant to breathe, that is, to allow air to pass there through during the vulcanization process of the tire thus not creating air pockets in the inward side of the tire mass.

Accordingly, in such silicone green tire lubricant compositions, it was found necessary, that most of the filler be a mica filler, although to a certain extent minor amounts of other fillers could be utilized in combination with the mica filler. In addition, the practice, as can be seen from pages 11 and 12 of the foregoing Traver application, was to first form a dispersion of the polysiloxane polymer with the emulsifying agents in water before the filler and other additives were added to form the desired composition. It was felt at that time that a proper dispersion could not be made unless the water and polysiloxane polymer and emulsifying agents were first added to form the silicone emulsion before the other ingredients were added. Unfortunately, it was found by such a process for producing such green tire lubricants as that set forth in the foregoing Traver case that the optimum lubricity properties were still not obtained with respect to the correlation of static to sliding friction. Although the mica was present in the composition and did allow the silicone lubricant composition to escape air, nevertheless, the silicone polymer in the composition did not lubricate the mica composition sufficiently so that the lubricant did not have the proper mixture of static to sliding friction unless the amount of silicone polymer and mica, as well as other ingredients, were unduly mixed resulting in the problems mentioned previously. With such a procedure of preparing the silicone green tire lubricant, as that disclosed in the foregoing Traver case, it was difficult if not impossible in some cases to obtain the optimum lubricity properties, that is, the combination of static to sliding friction for a particular designed green tire mass.

In addition it was found that with the prior art method of preparing the silicone lubricant, the mica in many cases, after repeated use of the bladder bag, would precipitate out and cause the lubricant to malfunction.

Accordingly, it was found to be highly desirable to have a process in which to properly lubricate the mica filler in preparing the green tire lubricant, such that the resulting green tire lubricant composition would not have the foregoing disadvantages.

Another problem that was obtained with utilization of prior art silicone green tire lubricant, was that as mentioned previously, it was necessary basically to have a certain filler loading as well as the other additives mentioned above to give the green tire silicone lubricant the proper balance of static to sliding friction for a particular green tire mass as well as a static friction that was high enough. However, unfortunately, there resulted in such composition as a result of unduly high filler loadings an undue increase in the viscosity of the final silicone green tire lubricant composition. Accordingly, for many machines and molding equipment that utilize silicone green tire lubricants it was found that lower viscosities were desired in the composition to be utilized in the molding equipment for spraying the silicone lubricant on the bladder. It was also highly desirable from a manufacturing point of view for producing silicone green tire lubricants that a particular manufacturer of tires specified a certain viscosity for the green tire lubricant and a certain static to sliding friction for that manufacturer of such green tire silicone lubricant to be able to control from batch to batch the final viscosity of his material.

Accordingly, it was highly desirable to find a simple process which would be utilized to monitor the viscosity of the silicone green tire lubricants to a constant value from batch to batch without such methods affecting other necessary properties of the silicone green tire lubricant composition and specifically the values of static and sliding friction.

Accordingly, it is one object of the present invention to provide for an improved process which allows an optimum lubrication of a mica filler in the production of a silicone green tire lubricant composition such that the final composition has the proper balance of static to sliding friction and a static friction that is at least 0.4. An additional object of the present invention is to provide for an improved process for producing a silicone green tire lubricant where a stable dispersion of the lubricant composition is formed while obtaining an optimum lubrication of the mica filler with the polysiloxane polymer.

It is an additional object of the present invention to provide for an improved process for controlling the end viscosity of a silicone green tire lubricant composition with little effect on the ingredients utilized in preparing the green tire lubricant composition.

It is still an additional object of the present invention to provide for an improved process in producing a silicone green tire lubricant composition which the viscosity of the composition can be controlled from batch to batch while still maintaining an optimum combination of static to sliding friction in the composition.

These and other objects of the present invention are accomplished by means of the disclosure set forth herein below.

SUMMARY OF THE INVENTION

In accordance with the above object there is provided an improved process for producing a silicone composition useful as a green tire lubricant with improved lubricity properties comprising:
  a. mixing 20 to 55 parts by weight of a mica filler with 2 to 20 parts by weight of a linear diorganopolysiloxane of a viscosity varying from 500 to 100,000 centipoise at 25° C where the organo group is selected from the class consisting of monovalent hydrocarbon radicals and halogenated monovalent hydrocarbon radicals to form a homogeneous mixture and,
  b. subsequently, adding to the homogeneous mixture in whatever order it is desired from 2 to 20 parts by weight of a mineral clay and 0.5 to 10 parts by weight of a first emulsifying agent selected from the class consisting of anionic, cationic and nonionic emulsifying agents and forming a second mixture and,
  c. finally adding the water in said second mixture and mixing the ingredients thoroughly to form the final silicone green tire lubricant composition.

It is critical in the instant process that the mica filler be first mixed with the polysiloxane polymer to form a homogeneous mixture. Secondly, the water must be the last ingredient to be added. The amount of water is added as desired to produce a silicone lubricant with the desired end viscosity and also so that the emulsion that is formed is stable.

Generally, 10 to 60 parts by weight of water to the above mixture is sufficient to prepare the desired dispersion.

Optional ingredients to the present composition are ingredients such as deodorizing agents, corrosion inhibitors other emulsifying agents and preservatives such as fomaldehyde such that the composition does not foster the growth of various types of bacteria and funguses.

There is also provided by the present invention a method for controlling the end viscosity of a silicone green tire lubricant composition such as the above or other types of green tire lubricant silicone compositions in which the amount of the basic ingredients is not changed and the viscosity of the final emulsified composition is simply controlled by the addition of effective amounts of buffering agents. Such buffering agents may be slightly acidic or slightly basic, usually an amount of buffering agent is added to reduce the pH of the composition. As the pH of such silicone green tire lubricant composition is reduced, the viscosity of the composition is also reduced Such a buffering agent is added after the silicone green time lubricant composition emulsion is formed and is added to batches of constant filler loadings so as to obtain the desired end viscosity from batch to batch in the manufacture of silicone green tire lubricants so as to reduce the viscosity of a particular green tire lubricant composition such that it meets a particular tire manufacturer's viscosity requirements.

Generally, there can be at least .01 by weight of said buffering agent and up to 1 to 5 percent by weight of the total silicone green tire lubricant composition. More preferably there is added from 0.1 to 1 percent by weight of the buffering agent depending on what is desired to reduce the viscosity of the composition. As can be appreciated, no firm concentrations need be given for the use of such buffering agent since the amount that is utilized will depend on the viscosity that is desired for the final composition.

Preferred buffering agents are generally any mild monocarboxylic acids or dicarboxylic acids and salts of such monocarboxylic acid or dicarboxylic acids. More preferred buffering agents within the above description are for instance sodium methylmethacrylate, sodium polymethylmethacrylate and N-(Lauryl-Myristyl)B-Aminopropionic Acid.

The second improved process for monitoring or controlling the viscosity of a particular silicone green tire lubricant composition allows a constant viscosity of the silicone green tire lubricant composition to be formed from manufactured batch to batch without changing the amount and types of other necessary ingredients that are necessary to formulate a specific green tire lubricant composition for a particular design green tire mass. In applying the method there can be obtained a silicone green tire lubricant composition with a desired end viscosity and with the optimum combination of lubricating properties, that is, an optimum combination of static to sliding friction that is desired for a particular design or formulated green tire mass.

It should be noted that the viscosity of the final composition be from 500 to 100,000 centipoise at 25° C and more preferably the viscosity should range between 1,000 to 20,000 centipoise at 25° C. Although green tire lubricant compositions with a higher or lower viscosity than the above ranges can be utilized, such compositions are generally not desirable for utilization in standard green tire lubricant dispensing equipment.

DESCRIPTION OF THE PREFERRED EMBODIMENT

The basic ingredient in addition to the mica filler that must be in the green tire lubricant composition is a silicone oil. Most preferably such silicone oil is a polydiorganosiloxane fluid being a viscosity ranging anywhere from 25 to 200,000 centipoise to 25° C, and more preferably the viscosity varies from 25 to 100,000 centipoise at 25° C. The organo groups of such polydiorganosiloxane are selected from monovalent hydrocarbon radicals and halogenated monovalent hydrocarbon radicals. Such monovalent hydrocarbon radicals and halogenated monovalent hydrocarbon radicals can be for instance, alkyl radicals such as methyl, ethyl, propyl and so forth; mononuclear aryl radicals such as phenyl, methylphenyl, ethylphenyl and so forth; alkenyl radicals such as vinyl, alkyl, and so forth; cycloalkyl radicals such as cyclohexane, cycloheptane and so forth; as well as halogenated monovalent hydrocarbon radicals which for instance can be, fluoronated alkyl radicals such as 3, 3, 3, trifluoropropyl.

In the most preferred embodiment of the instant invention it is preferred that the organo substituents of the polydiorganosiloxanes be selected from methyl, phenyl and vinyl and most preferably of all, all the organo radicals in such polydiorganosiloxane fluid or oil are preferably methyl radicals. Such linear polydiorganosiloxane fluids can be prepared by many processes, the most simple being the equilibriation of cyclic polysiloxane tetramers with the necessary amount of chain-stoppers in the mixture; such chain-stoppers being for instance, hexamethyldisiloxane, octamethyltrisiloxane and so forth. Such equilibriation of cyclic tetrasiloxanes such as for instance, octamethylcyclictetrasiloxane, with the necessary amount of chain-stoppers is carried out at elevated temperatures in the presence of any equilibriation catalyst such as toluene sulfonic acid, acid activated clay and many other known acidic catalysts for such reactions.

As a result of the equilibriation of such cyclic polysiloxanes, with chain-stoppers in the presence of an acid catalyst, there can be obtained a linear diorganopolysiloxane polymer having a viscosity of anywhere from 25 to 200,000 centipoise at 25° C. Most preferably the polymer that is utilized in the instant process is specifically a linear polydiorganosiloxane polymer having a viscosity of anywhere from 1,000 to 50,000 centipoise at 25° C.

Preferably in the instant invention, such silicone fluid is utilized at a concentration of from 2 to 20 parts by weight in the silicone green tire lubricant composition with respect to the other ingredients listed below. It should be noted that the parts that are given above by weight are not based on 100 parts of total composition, but are given with respect to the parts by weight of the ingredients given above. More preferably the linear diorganopolysiloxane polymer that is utilized in the process of the instant case, is utilized at a concentration of 5 to 15 parts by weight. It is only necessary that there be sufficient polysiloxane fluid to provide the proper amount of lubricity to the filler and as such to the final silicone green tire lubricant composition. Too little of the linear polysiloxane in the composition will result in the composition not having sufficient lubricity properties. On the other hand, too much of the linear polysiloxane will result in the final composition not having the desired static friction.

Accordingly, it is most preferred that the amount of polysiloxane that is utilized in the present process be in the range of 5 to 15 parts by weight, or more preferably 10 to 15 parts by weight. The other necessary ingredient in the process of the instant case is the filler, and specifically a mica filler.

Accordingly, with the amounts of the above linear polysiloxane there is generally utilized 20 to 55 parts by weight of mica filler and more preferably 20 to 40 parts by weight of mica filler. It should be noted that other fillers can be utilized to some extent in the instant process. However, half of the total filler in the instant composition that is produced by the instant process must be a mica filler.

It should be noted further, with respect to the mica filler, it is also desirable that the mica filler have a certain particle size. Such particle size can vary broadly, so as to be within the range of 160 to 600 mesh and more preferably in the range of 300 to 450 microns.

The presence of the mica filler is critical to producing a good green tire lubricant in accordance with the invention of the instant case. Mica is highly desirable as a filler in the green tire lubricant composition of the instant invention in that upon being properly lubricated with the linear polysiloxane oil, it provides the best combination of static to sliding friction as well as properly allowing the green tire lubricant composition to breathe.

Other fillers may be utilized in combination with the mica filler, however, such as talc, sand and fumed and precipitated silica utilized at a concentration of 5 to 30 parts by weight in formulating the silicone green tire lubricant composition of the instant case. More preferably, the concentration of the talc and sand and silica is utilized at a concentration of 10 to 20 parts by weight. It is only necessary that such additional filler ingredients be less than half of the total weight of filler ingredients present in the composition, that is, that the mica filler constitute at least 50 percent by weight of the total filler concentration in the silicone green tire lubricant composition of the instant case.

It is also desirable that such additional filler ingredients have a particle size in the above broad general range indicated for the mica filler, that is, a particle size within the range of 160 to 600 mesh.

It can of course be understood from the above that these additional filler ingredients are merely suggested to be added to the composition to take the place of some of the mica filler and thus reduce the cost of manufacturing the instant silicone green tire lubricant composition. Most preferably the silicone green tire lubricant composition contains, of the total filler loading, a mica concentration of 90 to 100 percent by weight.

In accordance with the process on the instant case it is a critical requirement that the fillers, and basically the mica filler and the other additional filler ingredients, be mixed with a linear polysiloxane at the initial step of the process so as to form a homogeneous mixture. Such mixing can be carried out in any convenient apparatus.

It is necessary that the linear polysiloxane and mica filler be mixed in the initial step of the process so that the mica platelets will be completely lubricated with the linear polysiloxane fluid so as to form a homogeneous mixture of the linear polysiloxane and mica filler.

After this step in the process has been carried out which then can be carried out at room temperature or at elevated temperatures, and is most desirably carried out at room temperature, the other ingredients can be added as desired, it only being necessary that the water be added to the ingredients last of all.

Accordingly, to stabilize the dispersion that is formed in the final step of the instant process, there is added to the composition 2 to 20 parts by weight of an alkylene oxide polyol, preferably there is utilized 5 to 15 parts by weight of the alkylene oxide polyol. There is nothing critical about the concentrations of the polyol since it is simply utilized at a concentration sufficient to stabilize the final dispersion that is formed. Any type of alkylene oxide polyol that is compatible with the ingredients in the silicone green tire lubricant composition can be utilized. Examples of commercially available alkylene oxide polyols are for instance, WS-661, sold by Olin Corporation; Poly G-3030 sold by Olin Corporation; HV-660 sold by Union Carbide; WL-850A sold by Jefferson Chemical Company; GP-3030 sold by Wyandotte Chemical Corporation. Such alkylene oxide polyols are well-known in the chemical industry and are readily available. Accordingly, it is felt that it is not necessary to go into a further description into the use of such alkylene oxide polyols in the instant composition, since their manufacture and properties are well-known and since the polyol in the instant case serves solely the purpose of stabilizing the final silicone green tire lubricant composition that is formed.

Another ingredient that is necessary in the instant process is a thickening agent whose main purpose, as was with the polyol, is to stabilize the dispersion that is finally formed to prevent precipitation out of the filler elements. Such thickening agents that may be utilized are for instance, mineral colloids and bentonite clays as well as organic thickening agents such as carboxylated vinyl polymers for example the Carbopol products of the B. F. Goodrich Company.

The function of such thickening agents, as mentioned previously, is merely to stabilize the final silicone dispersion that is formed without unduly increasing its viscosity. Accordingly, such thickening agents are preferably utilized at a concentration of 0.05 to 10 parts by weight and more preferably at a concentration of 0.05 to 5 parts by weight. The thickening agent is merely an ingredient that has been found suitable in silicone green tire lubricant compositions which in combination with an alkylene oxide polyol tend to stabilize the dispersion that is formed from the final composition.

There must also be added to the composition from 0.05 to 10 parts by weight and more preferably from 0.05 to 5 parts by weight of an emulsifying agent or surfactant. Such emulsifying agents and surfactants are well-known in the art and cover a wide variety of materials. Additionally, the present emulsifying agent or surfactant may be anionic, cationic or non-ionic emulsifying agents. The emulsifying agents that can be utilized can be, for instance, salts of fatty acids, e.g., ammonium oleate, acetates of fatty amines, monoesters of polyethylene glycols and fatty acids alkylated aryl polyether alcohols such as acetylphenoxypolyethylene alcohols and the like. Most preferably the emulsifying agent may be a sorbitan ester, such as sorbitan sesquileate or an alkylarylsulfonate, such as sodium dodecylbenzenesulfonate, or amine salt of an alkylarylsulfonic acid such as ammonium dodecylbenzenesulfonate or other amine salt of dodecylbenzenesulfonic acid and the like.

It should be noted, however, that the above list of emulsifying agents is given only as an example. Most any anionic, cationic and non-ionic emulsifying agent that is compatible with the other ingredients and specifically the polysiloxane and the mica filler as well as additional filler ingredients can be utilized in the instant case. The emulsifying agent or surfactant serves no other purpose than to stabilize the dispersion that is finally formed at the final step of the process, as was the case with the thickening agent and the alkylene oxide polyol. All these three ingredients' prime purpose is to stabilize the dispersion that is formed from the basic polysiloxane polymer and the mica filler and finally with the addition of water to form the dispersion. The amounts of such ingredients, while given above for a given weight of polysiloxane polymer and for a given weight of a filler, is optional; the only controlling factor being that they be utilized so as to give a dispersion of the optimum stability without unduly increasing the viscosity of the final emulsion.

Finally, after all the other ingredients have been added to the homogeneous mixture of the linear polysiloxane and the mica filler and additional filler ingredients, there is added the water and the composition is stirred by the appropriate mixing means to form a stable dispersion.

It should also be stated that the concentrations given for the thickening agent, emulsifying agent and the alkylene oxide polyol, in the above composition and process, have been give solely as directional guides and applicant does not maintain that there is anything critical about such concentrations. These concentration ranges have been given since it is felt that with a given concentration of linear polysiloxane and filler ingredients that the most stable dispersion, without unduly increasing the viscosity of the final dispersion composition, can be obtained within the above ranges. In addition, the above specific ingredients for preparing a dispersion in terms of the emulsifying agent thickening agent and alkylene oxide polyol are exemplary only.

In the final step of the process, there is preferably added from 10 to 60 parts by weight of water and as stated the mixture is mixed to produce a stable dispersion. The amount of water that is added can vary widely. The above range is given for the amount of water that by experience has indicated would produce a stable dispersion within the viscosity parameters mentioned previously.

As an alternative to the present process it should be mentioned that any one, but not all, of the three stabilizing and emulsifying ingredients mentioned previously, i.e., a thickening agent, the alkylene oxide polyol and the emulsifying agent, may be added to the initial mixture of the filler and silicone polymer to first form a homogeneous mixture of the linear polysiloxane and filler. The other two remaining ingredients may then be added in a subsequent step after the homogeneous mixture is formed. Further, these three ingredients can be added as a mixture together or separately to the homogeneous mixture of the linear polysiloxane and the filler ingredients.

In the most preferred embodiment of the instant case it is preferred that just the linear polysiloxane and the filler elements be mixed and the other ingredients such as the thickening agent the emulsifying agents and the alkylene oxide polyol be added in a second step of the process to the homogeneous mixture of the linear polysiloxane and the filler elements to which there is subsequently added to water to form a stable dispersion.

It is necessary in the instant process that all the other ingredients be mixed into a homogeneous mixture before the water is added in the last step of the process prior to forming the final silicone green tire lubricant composition.

Additional ingredients that may be added in addition to the emulsifying agent, thickening agent, and the alkylene oxide polyol, which may be required by a particular manufacturer, are for example, from 0.001 to 1 part by weight of a deodorizing agent, from 0.05 to 5 parts by weight of a second emulsifying agent which may be necessary for a specific application, and from 0.001 to 1 part by weight of a corrosion inhibitor. There may also be added from 0.001 to 1 part by weight of a preservative agent such as formaldehyde. The inhibitor can be, for instance, a hydrogen polysiloxane. These other ingredients are optional ingredients for the standard silicone green tire lubricant composition, the main ingredients having been set forth previously. Other ingredients may be added as needed to resolve certain specific requirements of a particular user of silicone green tire lubricant compositions.

It should be noted again, that the critical aspect of the instant process is a process for providing for a silicone green tire lubricant composition in which the linear polysiloxane is mixed with the filler ingredients first to form a homogeneous mixture and then the other additives such as the alkylene oxide polyol, the emulsifying agent and the thickening agent are added step-wise or all together to the homogeneous mixture to form a subsequent mixture with addition of any other additional ingredients and finally the second critical aspect of the instant process is the addition of the water in the last step prior to mixing to form a stabilized dispersion.

The second aspect of the instant invention involves a process for changing the viscosity and specifically lowering the viscosity of such silicone green tire lubricant composition emulsions after they are formed without an alteration in the type of concentration of the various ingredients in the emulsion. Such alteration and decreasing of the viscosity of such silicone green tire lubricant emulsions that are produced by the process of the instant case or produced by any process is possible through the addition of a buffering agent to the emulsion so as to lower its pH.

Accordingly, it is envisioned by the subsequent process of the instant case of preparing the silicone green tire lubricant emulsion by whatever means and then adding to it as effective amount of a buffering agent so as to lower the viscosity of the composition to its desired level. Preferably at least 0.01 percent and more preferably 0.1 to 1 percent by weight of the buffering agent is added by weight of the total dispersion. Such buffering agents may be generally selected from any mild buffering agents and specifically buffering agents tending toward acidity which can be selected from mild acids such as monocarboxylic acids and dicarboxylic acids and salts of monocarboxylic acids and dicarboxylic acids. Preferred buffering agents in the instant cases are for instance sodium methyl-methacrylate, sodium polymethylmethacylate and N-(Lauryl-Myristyl) B-Aminopropionic Acid. However, applicant does not intend to be bound to the above preferred buffering agents since any suitable buffering agent tending towards acidity in pH will be suitable to be utilized in the process of the instant case.

Such buffering agents are very well-known in the chemical industry and it is not felt that it is necessary to go into greater detail as to types and their descriptions.

Below there is given an exemplary list of some of the buffering agents that may be utilized in the subsequent process of the instant case:

| | |
|---|---|
| acrylic acid | sodium metabisulfite |
| acrylonitrile | sodium metaborate |
| isocinnamic acid | sodium metaphosphate |
| maleic acid | sodium pyrophosphate |
| oleic acid | sodium salt of |
| organosubstituted | isocrotonic acid |
| vinylacetic acid | sorbic acid |
| sodium acetate | sterolic acid |
| sodium and potassium salts | tetrolic acid |
| of methacrylic acid | undecylenic acid |

Such chemicals are manufactured and sold by:
American Hoechst Corp.
MC/B Mfg. Chemical
Matheson Coleman & Bell
Pfaltz Bauer Inc.
As stated previously, any of these buffering agents as well as many others would be suitable in the instant case. Applicant has made the unexpected discovery of the instant case that the viscosities of silicone green tire lubricant emulsions could be varied by the use of such buffering agents by lowering the pH of the emulsion while still maintaining a stable emulsion without altering the type of the other ingredients and the concentration of the other ingredients in the emulsion.

The foregoing examples are given for the purpose of illustrating the reduction to practice of the invention of the instant case. The examples are not given for any purpose in defining limitations in the specification of the instant case. All parts in the instant specification as well as the examples and percentages are by weight.

In the examples, use of ST stands for static friction and use of SL stands for sliding friction which can be determined by any published methods and particularly by the published method described in General Electric Co.'s Silicone Products Department paper CDS 2318 written and given by R. A. Moeller at Rubber Group Conference on June 15, 1973.

EXAMPLE I

To a one liter stainless steel beaker equipped with umbrella stirrer, there was added 120 gms. mica, 120 gms. talc, 20 gms. precipitated silica, 10 gms. mineral colloid, 50 gms. dimethylpolysiloxane of 1000 centipoise at 25° C, 50 gms. of GP 3030 and alkylene oxide polyol, 20 gms. of an amine salt of an alkylarylsulfonic acid designated G-3300 and 0.1 gm. mixture. The ingredients were added sequentially and blended until uniform. Once this semi-dry GTL was fully blended, 100 gms. of it was added to 100 gms. of water in a 400 ml stainless steel beaker and blended until uniform using an umbrella stirrer.

Once the semi-dry green tire lubricant was formulated with water, its lubricity properties were evaluated and are as follows:

| ST | SL |
|---|---|
| 0.476 | 0.356 |

(The above composition had outstanding properties as a green tire lubricant.)

EXAMPLE II

To a one liter stainless steel beaker equipped with umbrella stirrer there was added 20 gms. G-3300 an amine salt of an alkylarylsulfonic acid, 50 gms. GP 3030 an alkylene oxide polyol, and 50 gms. dimethylpolysiloxane of 1000 centipoise viscosity at 25° C. These three liquid ingredients were stirred until uniform. Then 245 gms. of water was added followed by 180 gms. 160WG mica, 60 gms. 901A talc, and 10 gms. mineral colloid M.O. The umbrella stirrer was stirring rapidly during all additions, when practical. Once the formulation was smooth and uniformly dispersed, it was evaluated for lubricity performance and had the following properties:

| ST | SL |
|---|---|
| 0.324 | 0.246 |

It can be seen that the green tire lubricant of Example 1 has a considerably higher static friction and sliding friction.

The following examples involve the use of Darvan 7 from Vanderbilt, Inc. and/or Deriphat 170 C from General Mills, Inc. as the buffering agents.

Darvan 7 is a 25% active aqueous solution of a polyelectrolyte claimed to be sodium methylmethacrylate or sodium polymethylmethacrylate. The pH of this material is between 9.5 and 10.5 Deriphat 170 C is an amphoteric material namely N-(Lauryl-Myristyl) B-Aminopropionic Acid.

EXAMPLE III

Deriphat only, needed to reduce viscosity to between 2500 and 6000 cps LVT viscometer 3 spindle at 3 rpm. There was prepared an emulsion in accordance with the instant invention having the following ingredients:

| | |
|---|---|
| Mica | 40 pts. |
| Dimethylpolysiloxane of 10,000 centipoise viscosity at 25° C | 10 pts. |
| $H_2O$ | 40 pts |
| Veegum F (Mineral Clay) | 0.6 pt. |
| WS-661 (Ethylene oxide, propylene oxide polyol) | 8.4 pts. |

The above materials were blended until homogeneous. The viscosity was greater than 30M cps. After adding 4 pt of Deriphat 170C and mixing one-half hour the viscosity dropped to 2500 cps.

EXAMPLE IV

Darvan plus Deriphat to reduce viscosity to 2500 – 6000 cps range. There was prepared an emulsion having the following ingredients:

| | |
|---|---|
| Mica | 40.2 pts. |
| Dimethylpolysiloxane of 10,000 centipoise viscosity at 25° C | 9.33 pts. |
| $H_2O$ | 39.77 pts. |
| Veegum F (Mineral Clay) | 0.6 pt. |
| WS-661 (Ethylene oxide, propylene oxide polyol) | 6.03 pts. |
| Deriphat 170 C | 4.0 pts. |

The viscosity after mixing was 14,400 cps. After adding 1.2% Darvan 7, the viscosity dropped to 4000 cps.

EXAMPLE V

Effect of using water to replace Deriphat in a low lubricity formulation.

This experiment shows that the decrease in viscosity is not simply a dilution effect when we compare the viscosities obtained using water in place of Deriphat 170 C.

There was prepared an emulsion having the following ingredients:

| | |
|---|---|
| Mica | 40.2 pts. |
| Dimethylpolysiloxane of 10,000 centipoise viscosity at 25° C | 9.33 pts. |
| Water | 39.77 pts. |
| Veegum F (Mineral Clay) | 0.6 pt. |
| WL-850A (Ethylene oxide, propylene oxide polyol) | 6.03 pts. |

At this point, the batch was split in half and labeled 1337 A and 1337 B. To 1337 A there was added 4% water wherein the viscosity was 18,000 cps. To 1337 B there was added 4% Deriphat 170 C wherein the viscosity dropped to 7,600 cps.

EXAMPLE VI

There was prepared an emulsion with the following ingredients:

| | |
|---|---|
| Mica | 36 pts. |
| Dimethylpolysiloxane of 10,000 centipoise viscosity at 25° C | 10 pts. |
| Water | 40.4 pts. |
| Veegum F (Mineral Clay) | 0.6 pt. |
| WS-661 (Ethylene oxide, propylene oxide polyol) | 12.0 pts. |

The WS-661 that was used was a 50/50 blend of WS-661 buffered with Darvan 7 to a pH of 8.5 and WS-661 buffered to a pH of 6.5. The resulting emulsion had a viscosity of 29,200 cps. at 25° C.

To one-half of the above emulsion there was added 0.05 Darvan 7 and the viscosity dropped to 10,000 cps.

To the other half of the above emulsion there was added 0.05% Darvan 7 and the viscosity dropped to 4,000 cps.

As Examples I through III show, there is obtained a silicone green tire lubricant composition having a good combination of static to sliding friction, utilizing the process of the instant invention, wherein the ingredients are mixed and preferably there is mixed together the linear polysiloxane with the filler ingredients first and then the other ingredients added and wherein the water is added last to form the emulsion.

Utilizing the instant process there is obtained a stable emulsion, as stable as that prepared by prior art methods which has an excellent combination of static to sliding friction.

As also indicated by Examples III through VI the use of the specific buffering agent Deriphat 170 C and Darvan 7 effectively controls and lowers the viscosity of a silicone green tire lubricant composition by the simple addition of small amounts of these buffering agents to exemplary experimental silicone green tire lubricant compositions.

It is postulated that these buffering agents control the viscosity as a result of their effect on the alkylene oxide polyol that is present.

Irrespective of whether this is true, it is found that the use of buffering agents in lowering and controlling the pH of silicone green tire lubricant compositions, as exemplified by the above examples, allows the control of the final viscosity of silicone green tire lubricant compositions, without altering the amount and type of ingredients used therein as has been exemplified in the above Examples III through VI.

We claim:

1. A process for producing a silicone composition useful as a green tire lubricant with improved lubricity properties comprising:
    a. mixing 20 to 55 parts by weight of a mica filler with 2 to 20 parts by weight of a linear diorganopolysiloxane of a viscosity varying from 500 to 200,000 centipoise at 25° C where the organo group is selected from the class consisting of monovalent hydrocarbon radicals and halogenated monovalent hydrocarbon radicals to form a homogeneous mixture;
    b. adding to said mixture 2 to 20 parts by weight of an alkylene oxide polyol, 0.05 to 10 parts by weight of a mineral clay and 0.05 to 10 parts by weight of a first emulsifying agent selected from the class consisting of anionic, cationic and non-ionic emulsifying agents and forming a second mixture and
    c. adding to said second mixture sufficient water to form an emulsion after the second mixture is thoroughly mixed with said added water.

2. The process of claim 1 wherein said polyol is added in step (a) and a homogeneous mixture is formed therefrom.

3. The process of claim 1 wherein the step (a) said mineral clay is added and a homogeneous mixture is formed therefrom.

4. The process of claim 1 wherein said emulsifying agent is added is step (a) and a homogeneous mixture is formed therefrom.

5. The process of claim 1 wherein the amount of water that is added is from 10 to 60 parts by weight.

6. The process of claim 5 wherein in step (a) there is added from 5 to 30 parts by weight of a second filler selected from the class consisting of talc and sand.

7. The process of claim 1 wherein in step (b) there is added 0.001 to 1 part by weight of a deodorizing agent.

8. The process of claim 1 wherein in step (b) there is added from 0.05 to 5 parts by weight of a second emulsifying agent.

9. The process of claim 1 wherein in step (b) there is added from 0.001 to 1 part by weight of a corrosion inhibitor.

10. The process of claim 1 wherein in step (c) there is added from 0.001 to 1 part by weight of a preservative agent.

11. A process for controlling the viscosity of a silicone composition useful as a green tire lubricant comprising,
    a. mixing from 20 to 55 parts by weight of a mica filler with 2 to 20 parts by weight of linear diorganopolysiloxane having a viscosity varying from 500 to 200,000 centipoise at 25° C where the organo group is selected from the class consisting of monovalent hydrocarbon radicals and halogenated monovalent hydrocarbon radicals and with 2 to 20 parts by weight of an alkylene oxide polyol, 0.05 to 10 parts by weight of a mineral clay, 0.05 to 10 parts by weight of an emulsifying agent selected from the class consisting of anionic, cationic and non-ionic emulsifying agents and 10 to 60 parts of water to form an emulsion, and
    b. adding an effective amount of a buffering agent to the emulsion so as to reduce the viscosity to the desired level.

12. The process of claim 11 wherein there is added at least 0.01 percent by weight of said buffering agent.

13. The process of claim 12 wherein said buffering agent is selected from the class consisting of monocarboxylic acid, dicarboxylic acid and salts of monocarboxylic acids and dicarboxylic acids.

14. The process of claim 13 wherein said buffering agent is sodium methylmethacrylate.

15. The process of claim 13 wherein said buffering agent is sodium polymethylmethacrylate.

16. The process of claim 13 wherein said buffering agent is N-(Lauryl-Myristyl) B-Aminopropionic Acid.

17. The process of claim 11 wherein there is added in step (a) from 5 to 30 parts by weight of a second filler selected from the class consisting of talc and sand.

18. The process of claim 17 wherein in step (a) there is added from 0.001 to 1 part by weight of a deodorizing agent.

19. The process of claim 18 wherein in step (a) there is added from 0.05 to 5 parts by weight of a second emulsifying agent.

20. The process of claim 19 wherein in step (a) there is added from 0.001 to 1 part by weight of a corrosion inhibitor.

21. The process of claim 20 wherein in step (a) there is added from 0.001 to 1 part by weight of a preservative.

* * * * *